United States Patent
Chan et al.

(10) Patent No.: US 11,070,303 B2
(45) Date of Patent: Jul. 20, 2021

(54) MANAGEMENT MESSAGE LOOP DETECTION IN PRECISION TIME PROTOCOL

(71) Applicant: Arista Networks, Inc., Santa Clara, CA (US)

(72) Inventors: Jeff Jing Yuen Chan, Vancouver (CA); Avininderpal Singh Grewal, Vancouver (CA); Petr Budnik, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 75 days.

(21) Appl. No.: 16/683,259

(22) Filed: Nov. 14, 2019

(65) Prior Publication Data
US 2021/0152267 A1 May 20, 2021

(51) Int. Cl.
*H04J 3/06* (2006.01)
*H04L 12/24* (2006.01)
*H04L 12/58* (2006.01)

(52) U.S. Cl.
CPC .......... *H04J 3/0667* (2013.01); *H04J 3/0679* (2013.01); *H04L 41/0631* (2013.01); *H04L 41/147* (2013.01); *H04L 51/14* (2013.01); *H04L 51/30* (2013.01)

(58) Field of Classification Search
CPC . H04B 7/18589; H04L 7/0008; H04L 7/0054; H04L 7/033; H04L 27/2655; H04L 41/0631; H04L 41/147; H04L 51/14; H04L 51/30; H04J 3/0613; H04J 3/0635; H04J 3/0638; H04J 3/0658; H04J 3/0667; H04J 3/0679; H04J 3/0685; H04J 2011/0096; H04J 2013/0096; H04W 56/001

See application file for complete search history.

(56) References Cited

U.S. PATENT DOCUMENTS

| | | | | |
|---|---|---|---|---|
| 9,155,062 | B2* | 10/2015 | Traore | H04J 3/0682 |
| 9,819,541 | B2* | 11/2017 | Garg | H04J 3/0667 |
| 10,432,336 | B2* | 10/2019 | Rabinovich | H04J 3/0682 |
| 2013/0227172 | A1* | 8/2013 | Zheng | H04J 3/0658 709/248 |
| 2015/0318941 | A1* | 11/2015 | Zheng | H04J 3/0641 370/503 |
| 2016/0149692 | A1* | 5/2016 | Kim | H04L 12/4625 370/503 |

OTHER PUBLICATIONS

Garner, Specialization of IEEE 1588 Best Master Clock Algorithm to 802.1AS, SAMSUNG Electronics, IEEE 802.1 AVB 2006/IEEE 1588, 37 pages, Jun. 6, 2006.*

(Continued)

*Primary Examiner* — Frank Duong
(74) *Attorney, Agent, or Firm* — Fountainhead Law Group P.C.

(57) ABSTRACT

The forwarding of a management message received in a network device includes determining whether a previously received message sent by the same sender has looped back to the network device. The message is forwarded if the received message is not a loop back of a previously received message, and dropped otherwise.

20 Claims, 9 Drawing Sheets

(56) References Cited

OTHER PUBLICATIONS

Broman et al., Endlessly Circulating Messages in IEEE 1588-2008 Systems, downloadable at http://www.eecs.berkeley.edu/Pubs/TechRpts/2014/EECS-2014-62.html, 9 pages, May 13, 2014.*

Silicon Labs, AN 1202: ITU-T Precision Time Protocol Grandmaster, Boundary Clock, and Slave Clock Mode, downloadable at silabs.com, pp. 1-21, Mar. 2019.*

IEEE Std 1588™-2019, IEEE Standard for a Precision Clock Synchronization Protocol for Networked Measurement and Control Systems, IEEE, 499 pages, Nov. 7, 2019.*

* cited by examiner

MANAGEMENT MESSAGE LOOP DETECTION IN PRECISION TIME PROTOCOL

BACKGROUND

The Precision Time Protocol (PTP) is a network protocol used to exchange timing information among nodes (network devices such as switches, routers, host computers, machinery, etc.) in the network to achieve microsecond to nanosecond accuracy across the network. Nodes that participate in PTP are referred to as "clocks" and can have one or more ports that are enabled for PTP. Each PTP-enabled port on a clock can serve as master port and/or a slave port. PTP defines several kinds of messages, including messages that establish a timing hierarchy among the clocks and their ports and messages that perform synchronization between clocks. PTP includes a type of message called a management message that supports the PTP network by managing the passing of PTP information between clocks, setting different PTP configurations in the network, and generating events.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

A PTP network can configure its clock and ports into a timing tree by passing Announce message among the ports, causing port states to change to a MASTER, SLAVE, or PASSIVE state in accordance with a Best Master Clock Algorithm (BMCA). Nodes in the PTP network pass management messages to access PTP information and set configurations. PTP restricts the forwarding of management messages on ports that are in certain port states so as to prevent cycling of management messages in the network. The restriction is effective when the port states are in steady state.

However, changes in the network such as link failures or switch failures can temporarily cause the timing tree to be unstable, resulting in ports changing their port state in order to reform the timing tree. At this time, the timing tree may no longer be a tree and timing loops may temporarily arise due to the formation of redundant links as port states attempt to reconverge. During this time, management messages may cycle in a loop continuously creating more and more management messages, eventually causing a PTP network outage.

Embodiments in accordance with the present disclosure employ loop detection table that allows for detecting loop backed messages, which are management messages that had been forwarded by a clock that have looped back to that clock. When the clock receives a message that has looped back, the clock can drop the message thus breaking the loop and preventing PTP network outage.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
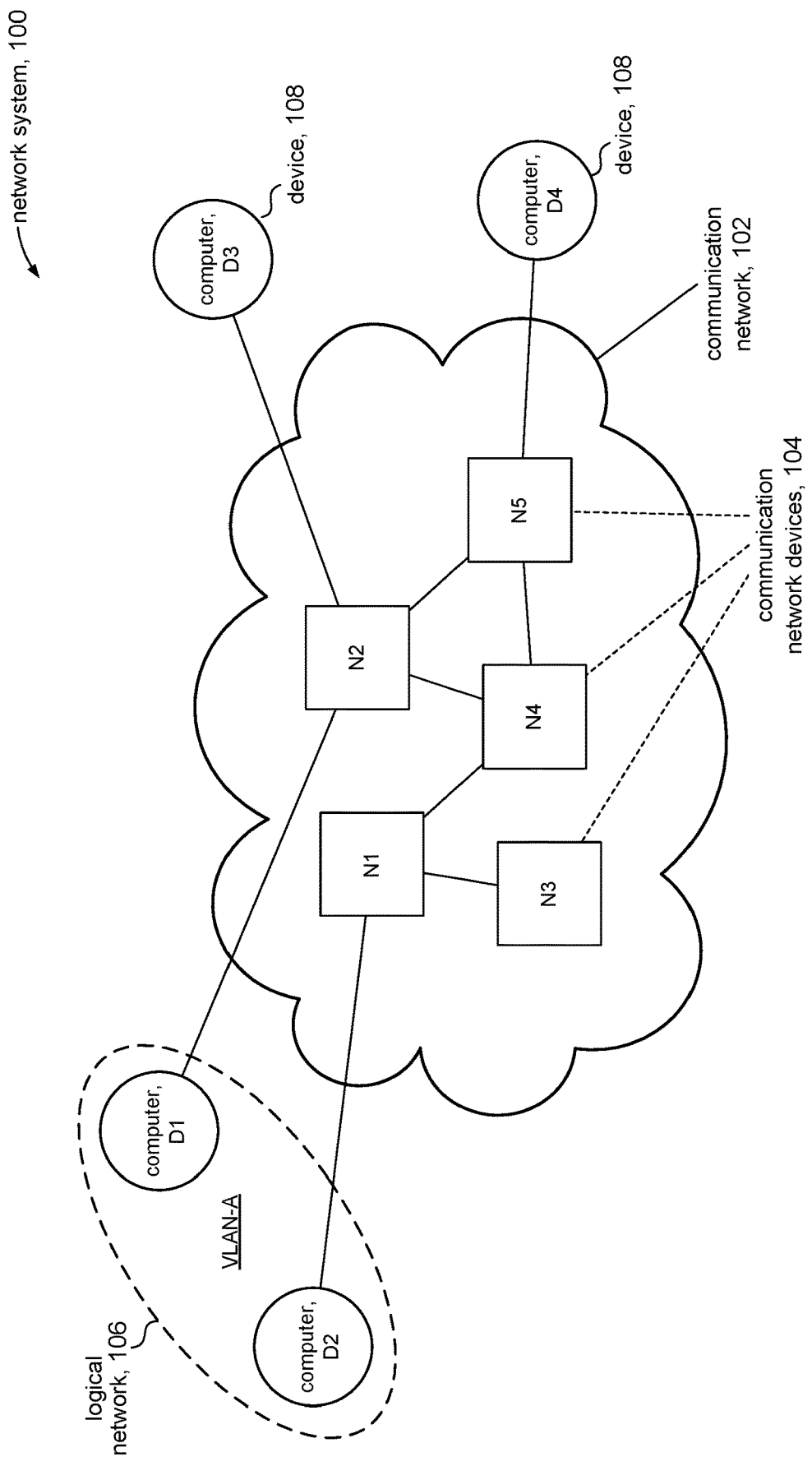
FIG. 1 illustrates a system block diagram in accordance with some embodiments.

FIG. 1 is a general representation of a networked communication system (network system) 100 configured to synchronize clocks in the network devices that constitute the network system in accordance with the present disclosure. The network system 100 includes a communication network 102 comprising a collection of interconnected cooperating switches and routers, designated as N1-N5 and collectively referred to as communication network devices 104, to provide communication among computing devices 108 (designated as D1-D4). Computing devices 108 can include computers, computer-based machines, and computer-based systems in general. In some embodiments, the communication network 102 can be a local area network (LAN).

System 100 can be configured with one or more logical networks 106. In some embodiments, for example, the logical networks can be virtual local area networks (VLANs). Merely to illustrate, FIG. 1 shows devices D1, D2 to be configured in VLAN-A. Not all devices are configured in a VLAN. For example, devices D3, D4 can be systems that do not communicate over a VLAN.

Network devices 104 and computing devices 108 can be configured to synchronize their respective clocks. In some embodiments, for example, clock synchronization in accordance with the present disclosure can be based on the Precision Time Protocol (PTP) standard defined by the IEEE 1588-2008 specification, which is incorporated herein by reference for all purposes and referred to herein variously as the PTP standard, PTP protocols, and so on. Accordingly, and merely to provide a vehicle for disclosing aspects of the present disclosure, embodiments in accordance with the present disclosure will be explained in the context of PTP processing and PTP terminology as defined in the PTP standard. Persons of ordinary skill, however, will understand that the present disclosure can be adapted to other clock synchronization methodologies. In keeping with PTP terminology, devices 104, 108 can also be referred to the following descriptions as "clocks."

A device 104, 108 can be referred to as an "ordinary clock" when the device has only one port (interface) that is configured (enabled) for processing in accordance with the PTP standard; e.g., performing clock synchronization operations. For instance, computing devices 108 communicate over a single port and so can be referred to as ordinary clocks. A device can be referred to as an "boundary clock" when the device has multiple ports that are PTP-enabled. For example, network devices 104 such as switches and routers that are configured for PTP can be referred to as boundary clocks.

The PTP standard specifies how the clocks in system 100 synchronize with each other. As explained below, the clocks are organized into a master/slave synchronization hierarchy (timing tree) with a grandmaster clock at the top of the hierarchy that determines the reference time for the entire system. The PTP standard defines various types of messages. For example, the Announce message is used to establish the master/slave timing tree. Synchronization messages (e.g., Sync, Delay_Req, Follow_Up, and Delay_Resp) are used to communicate timing information needed to synchronize the clocks. Management messages are used to query and update clock data (data sets) maintained by the clocks. Management messages are also used to customize a PTP system and for initialization and fault management.

Figure 2A:
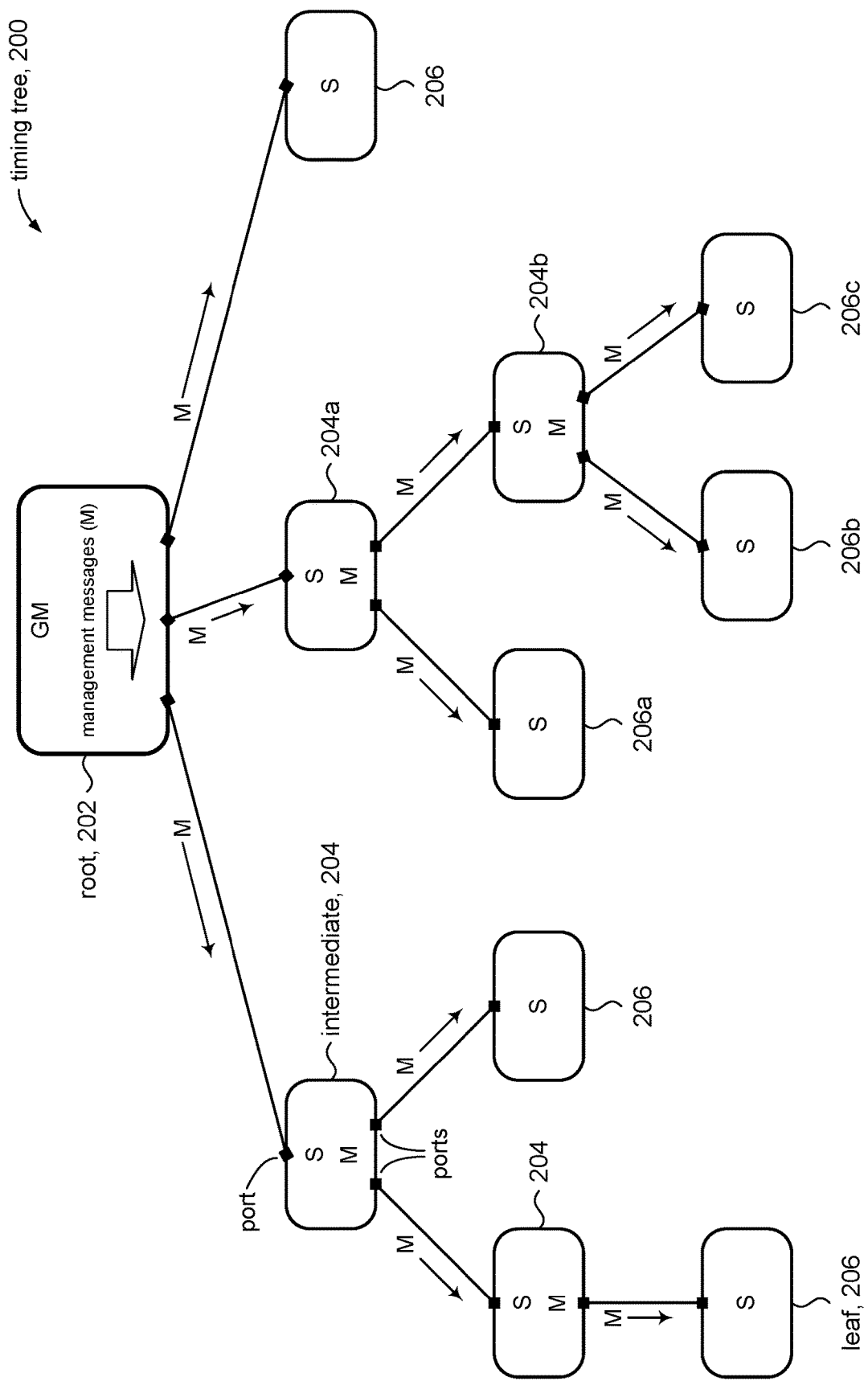
FIG. 2A illustrates an example of a timing tree.

FIG. 2A illustrates an example of a master clock/slave clock timing tree 200. The timing tree 200 includes a root node 202, one or more intermediate nodes 204, and one or more leaf nodes 206, arranged in a hierarchy. Each node represents a clock in a network system (e.g., devices 104, 108 in system 100, FIG. 1). The root node 202 can be referred to as the grandmaster (GM) clock, and can be an ordinary clock or a boundary clock. The timing tree 200 topology is established using the Announce message to pass clock data among the clocks in a network and an algorithm (Best Master Clock algorithm, BMCA) to determine a current state for each port of a clock based on that clock data. Each port of each clock maintains a state machine to define what state (e.g., MASTER, SLAVE, etc.) the port will transition to given its current state and its previous state.

FIG. 2A further illustrates an example of the propagation of management messages. For example, the GM 202 can issue management messages, which propagate down the timing tree 200. Although the figure shows the progress of one such management message M from the GM 202, it will be understood that the GM can send a stream of management messages as part of its normal operations. When a boundary clock receives the management message M on its (ingress) port, the message can be forwarded down the timing tree 200 via one or more of its other (egress) ports depending on their port states; i.e., some port states permit forwarding other port states do not. In a stable PTP network where each PTP enabled port is in a stable PTP port state, all management messages flow in the downstream direction in the timing tree 200 because a tree-like network topology is guaranteed for distributing PTP traffic. Ports in a clock that contribute to a possible timing loop will be put into a port state referred to the PASSIVE state so the clock knows not to forward management messages on those ports.

Figure 2B:
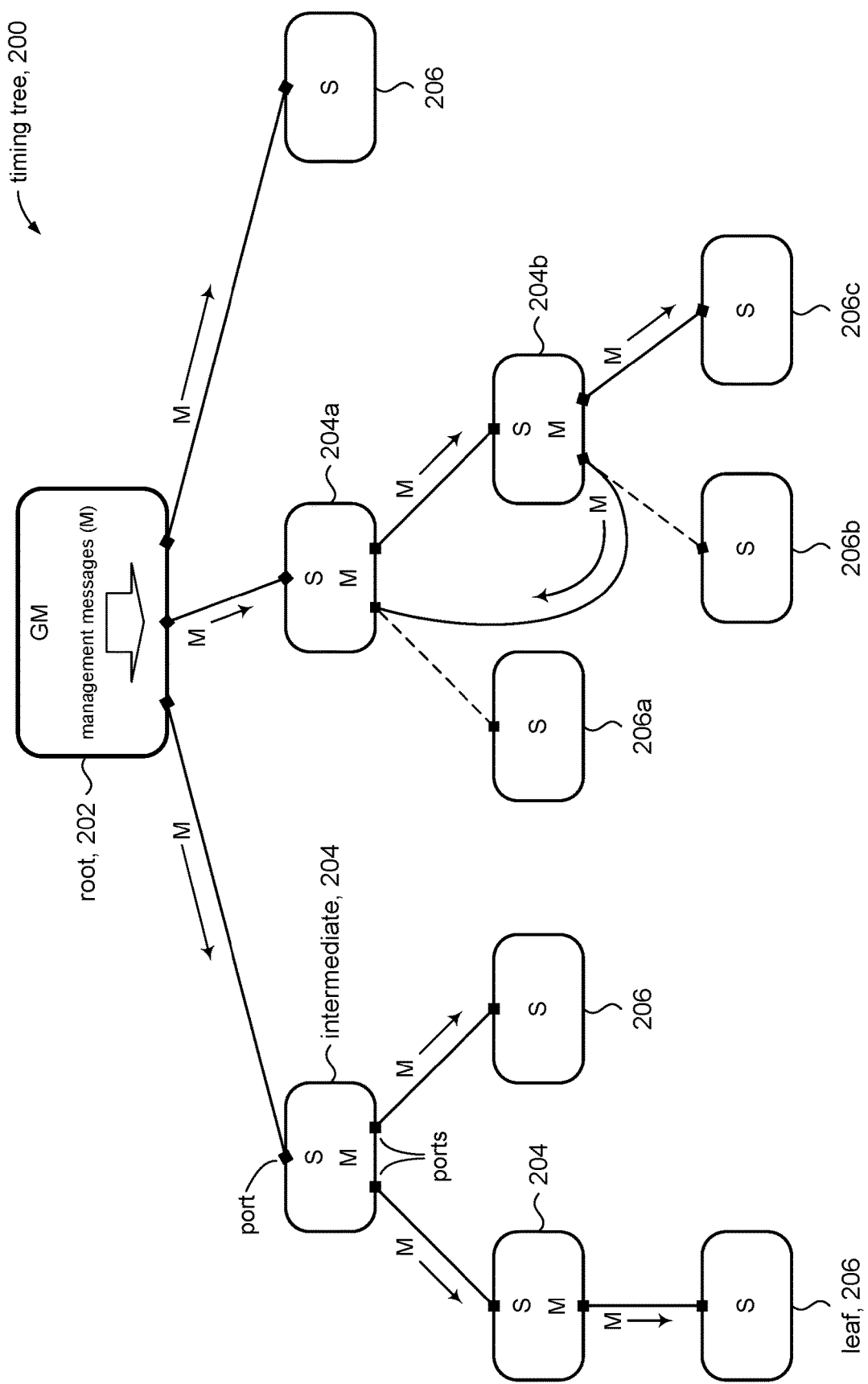
FIG. 2B illustrates an example of a loop in the timing tree.

Referring to FIG. 2B, changes in the network such as link failures, switch failures, misconfigurations by a system administrator, and so on, can temporarily cause the timing tree 200 to become unstable and loops can form. Generally, the spanning tree protocol (STP) which operates at Layer 2 (data link layer) can identify loops in the network and block ports appropriately to prevent such loops from forming. However, if a PTP port is configured as a routed port (Layer 3, network layer), the port does not participate in STP and loops can arise. When switches fail or links fail, or even if a network operator simply changes the PTP priority of a node on the network, the BMCA may respond by changing one or more PTP port states across the PTP network topology, referred to a converging. During this time while BMCA is busy converging, the continued sending of management messages from the GM 202 can result a storm of management messages in the network due to the formations of loops in the topology.

FIG. 2B shows an example, where nodes 206a, 206b have failed and/or the links to those nodes have failed. The example, further illustrates that a port on node 204b loops back to a port on node 204a. We see that when a management message M is forwarded from node 204a to node 204b, the message will be forwarded from node 204b to node 206c. However, due to the failure, node 204b will also loop back the message to node 204a, which will then feed the message forward again to node 204b, thus sustaining a loop between node 204a and 204b. Management messages can cycle in a loop continuously creating more and more management messages.

The PTP standard defines a hop counter (boundaryHops) in the management message that is decremented each time the message is forwarded. Upon reaching zero, the management message is dropped, thus limiting the number of hops a message can take. However, a network fault can result in many different loops involving many different ports in the network, resulting in the looping of many management messages through the network. The continued injection of management messages into the network can perpetuate the condition despite the hop counters; older messages will get dropped but not before new management messages are introduced. The resulting storm of management messages looping through the network can load the processing at each node to the point of impeding attempts at convergence to a new timing tree, resulting in PTP network outage.

The discussion will now turn to embodiments for addressing the formation of loops in a timing tree in accordance with the present disclosure.

Figures 3, 4:
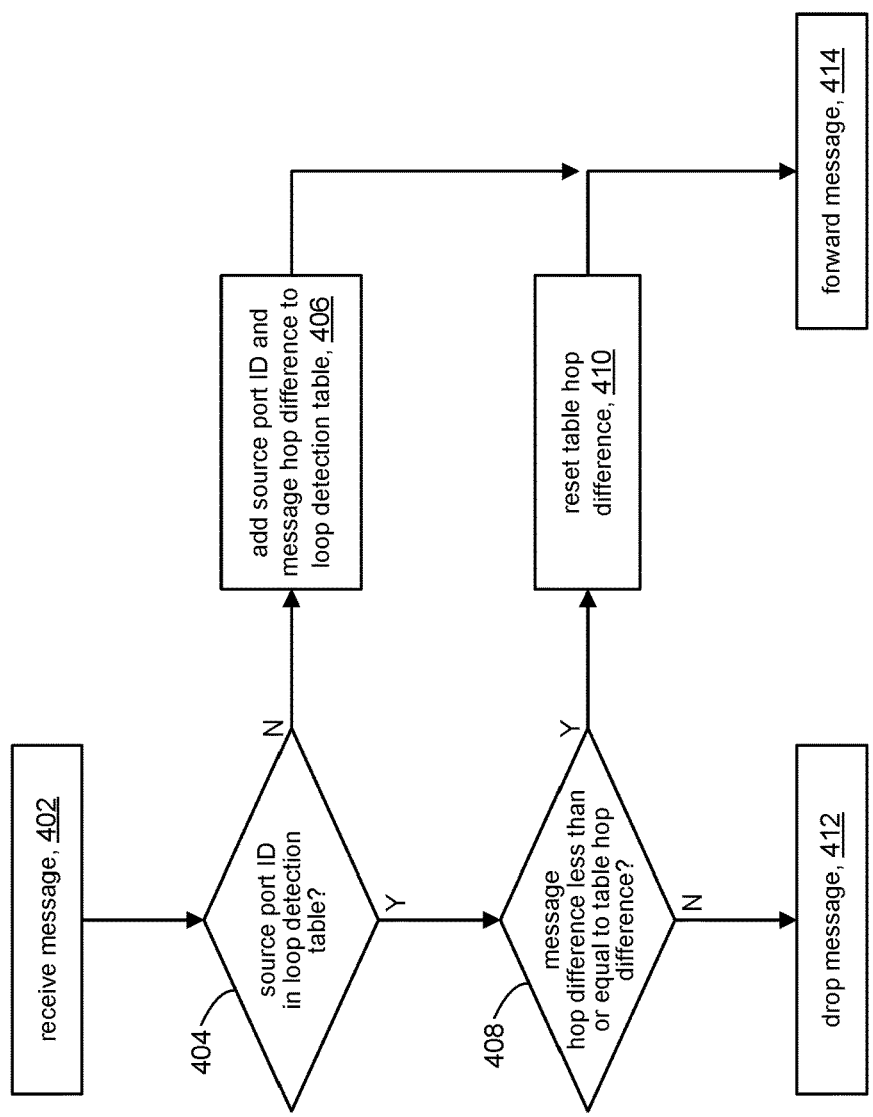
FIG. 3 shows an illustrative example of a management message.
FIG. 4 shows processing in accordance with the present disclosure.

FIG. 3 shows some data fields in a management message 302 in accordance with the PTP standard. Management messages in accordance with embodiments of the present disclosure are "original" management messages in that they are not messages issued in response to a previous management message. The management message 302 includes a header portion 304 that includes, among other information, a source port identifier (sourcePortIdentity) that represents the port number of the port on the clock (e.g., network device 104, FIG. 1) that originated the management message. The source port identifier is preserved with each retransmission of the management message from one clock to the next and identifies the original sender (referred to herein simply as "sender") of the management message. A target port identifier (targePortIdentity) 306 represents the port number of the port on the clock the management message 302 is being sent to. A starting hop value (startingBoundaryHops) 308 is set to an implementation-dependent value. A boundary hop counter (boundaryHops) 310 indicates the remaining number of successive retransmissions of the management message 302 that can be made. The value of the boundary hop counter can be initially set to the starting hop value when the management message is first transmitted by the issuing clock. The action field 312 indicates the action to be taken on receipt of the management message 302; e.g., provide data to the issuing clock, update data, and so on.

Referring to FIG. 4, the discussion will now turn to a high level description of processing in a boundary clock (e.g., network device 104, FIG. 1) for forwarding a management message in accordance with the present disclosure. In some embodiments, for example, the boundary clock can include computer executable program code, which when executed by a processor (e.g., 602, FIG. 6), can cause the processor to perform operations in accordance with FIG. 4. It will be understood that in the description of FIG. 4 any reference to "clock" will be understood to refer to a boundary clock unless explicitly stated otherwise; ordinary clocks do not forward management messages.

At operation 402, the clock can receive a management message ("message") on one of its ports for processing, and in particular to determine whether or not to forward the received message. The message format shown in FIG. 3 will be used for discussion purposes.

Figure 5:
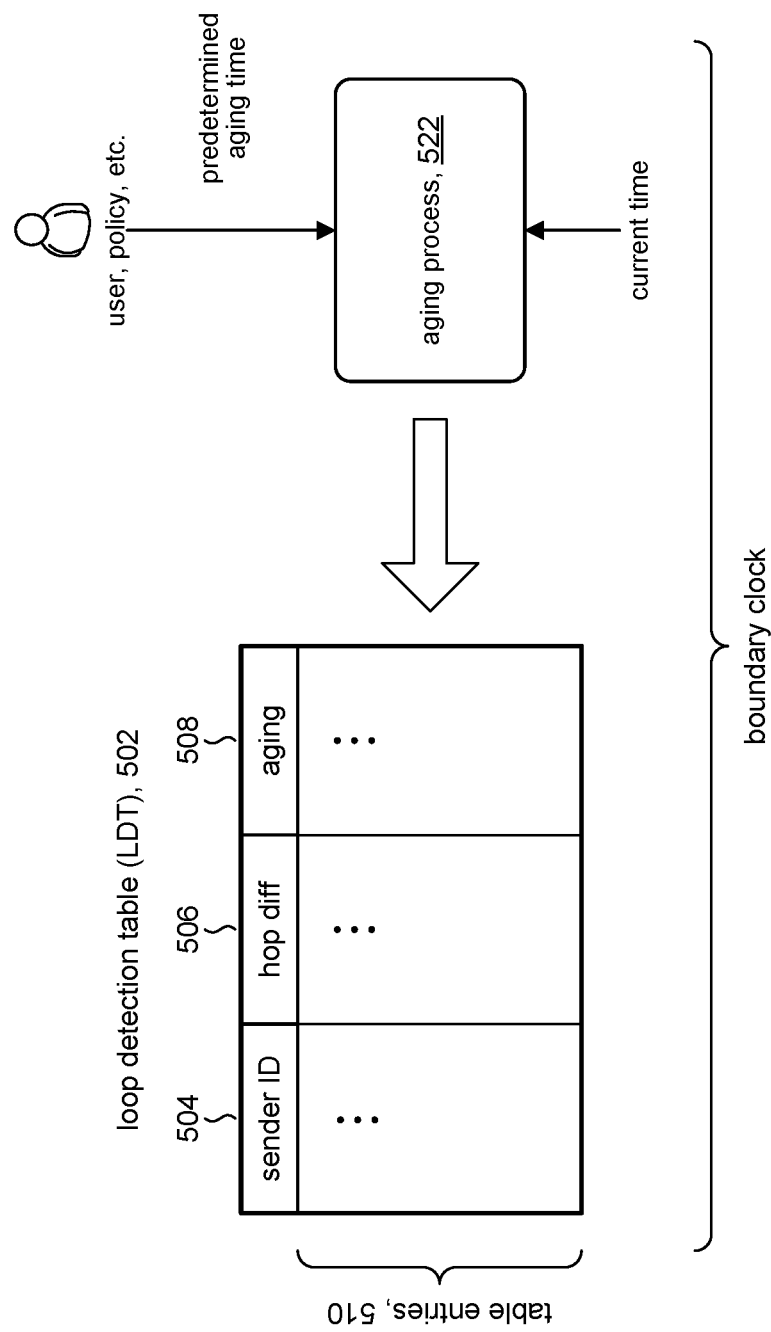
FIG. 5 shows a loop detection table in accordance with the present disclosure.

At operation 404, the clock can determine whether or not it has previously received a message from the same original sender of the currently received message. In some embodiments, for example, the clock can maintain a loop detection table to keep track of senders of previously received messages. Referring for a moment to FIG. 5, a loop detection table 502 in accordance with some embodiments can include a sender identifier (ID) field 504 and a hop difference field 506. The sender ID field 504 represents the sourcePortIdentity information 304 (sender ID) in a given management message. The hop difference field 506 is the difference (absolute value) between the startingBoundaryHops information 308 and the BoundaryHops information 310 in the given management message. Continuing with operation 404, the clock can search the loop detection table 502 using the sourcePortIdentity information 304 contained in the received message as the search key. If an entry 510 is not found, then the clock can continue processing at operation 406. If an entry 510 is found, then the clock can continue processing at operation 408 to determine whether the received message is a new management message from the sender or a previously sent management message that has looped back to the clock.

Entry not Found in Loop Detection Table

If an entry is not found in the loop detection table 502, this can indicate that the sender of the currently received message has not sent any previous messages. Accordingly, at operation 406, the clock can create a new entry in the loop detection table 502. In some embodiments, for example, the sourcePortIdentity information 304 contained in the received message can be copied into the sender ID field 504 of the new entry. The absolute value of the difference between the startingBoundaryHops information 308 and the BoundaryHops information 310 in the received message can be stored in the hop difference field 506 of the new entry. The aging field 508 is discussed below. This newly created entry 510 will represent the currently received management message as a previously received message that was sent by the sender of the currently received message. Processing can continue at operation 414 to forward the received message.

Entry Found in Loop Detection Table

If an entry is found in the loop detection table 502, this can indicate that the sender of the currently received message has sent a previous message. Accordingly, at operation 408, in response to a determination that an entry 510 in the loop detection table 502 has been found, the clock can assess whether or not the received message is a new management message from the sender or a looped message from a management message previously sent by the same sender. In some embodiments, for example, the assessment can include using the entry 510 found in the loop detection table 502 at operation 404 to determine whether or not the boundary hop difference in the received message is the same as or smaller than before. As noted above, the entry 510 represents a message previously sent by the sender of the currently received message. In some embodiments, the clock can compute the hop difference between startingBoundaryHops 308 and BoundaryHops 310 contained in the received message. If this computed hop difference is less than or equal to the hop difference field 506 in the entry 510, then processing can continue at operation 410. If the computed hop difference is greater than the hop difference field 506 in the entry 510, then processing can continue at operation 412.

At block 410, in response to a determination that the computed hop difference of the received message is less than or equal to the hop difference field 506, the clock can reset the hop difference field 506 with the computed hop difference. For example, the computed hop difference can be equal to what is already stored in the hop difference field 506 if the received message is simply a new management message from the sender. The computed hop difference can be smaller than before if the sender sends a new management message after one or more boundary clocks between the sender and the receiver have been removed. Examples of these situations are illustrated below. In either case, the received message can be deemed to be a newly sent management message and not a looped back message. Processing can continue at operation 414 to forward the received message.

At operation 412, in response to a determination that the computed hop difference of the received message is greater than the hop difference field 506, the clock can drop the received message. For instance, the computed hop difference can be greater than before if the sender sends a new management message after one or more boundary clocks between the sender and the receiver have been added, in which case the received message is not a looped message. On the other hand, the computed hop difference can also be greater than before in the case of a looped message. Examples of these situations are illustrated below. Determining whether the message is looped or not can be involve additional processing by the clock that may impact the clock's performance. Accordingly, in some embodiments, the clock can drop the received message, irrespective of whether the computed hop difference being greater than the hop difference field 506 is due to a newly sent message or a looped back message. Processing of the received message can be deemed complete.

At operation 414, in response to a determination that the computed hop difference is less than or equal to the hop difference field 506, the clock can forward the received message. In accordance with some embodiments, the clock can decrement the BoundaryHops data field 310 in the received message by one to reduce the remaining number of retransmissions permitted for the message. The clock can forward the receive message, with the updated BoundaryHops data field 310 down the timing tree 200 (FIG. 2). In some embodiments, for example, the clock can forward the message on its PTP-enabled ports that are in a permitted port state as defined in the PTP standard, namely MASTER, SLAVE, UNCALIBRATED, and PRE_MASTER. Processing of the received message can be deemed complete.

Returning to the loop detection table 502 shown in FIG. 5, recall that each clock maintains its own loop detection table. In accordance with some embodiments, entries 510 in the loop detection table can age out; i.e., an entry is deleted from the table after a period of time. The loop detection table 502 can include an aging field 508 to facilitate this aging process. For instance, when the clock adds an entry to the table (e.g., operation 406), the clock can store a time value in the aging field 508 that represents a time when the entry was added. An aging process 522 executing in the clock can periodically run through the loop detection table 502 to identify and delete entries in the table that are older than a predetermined aging time (predetermined age). In some embodiments, the "age" of an entry can be computed as the difference between a current time in the clock and the time stored in its aging field 508. In some embodiments, the predetermined aging time can be set according to a policy, set by an administrator, and so on. Setting the predetermined aging takes into account a maximum time it takes for a message to loop. If the predetermined aging time is smaller than this maximum time, some looped messages may never get dropped. Determining a suitable aging time depends on the particular network involved and is beyond the scope of the present disclosure.

Entries 510 are aged out when the interval between management messages exceeds the predetermined aging time. The aging process provides a self-correcting mechanism for dropping non-looped management messages, which can happen as explained above. Recall from operation 412 that, in some embodiments, a new management message sent after a boundary clock has been inserted between the sender and the receiver will be dropped; this message is not a looped back message and should be forwarded instead of being dropped. The aging process can correct for this situation. Over time, the table entry will be aged out and subsequent management messages from the sender will resume being forwarded. The setting of the predetermined aging time will affect how long it takes before the clock can start forwarding management messages from the sender.

Figure 6:
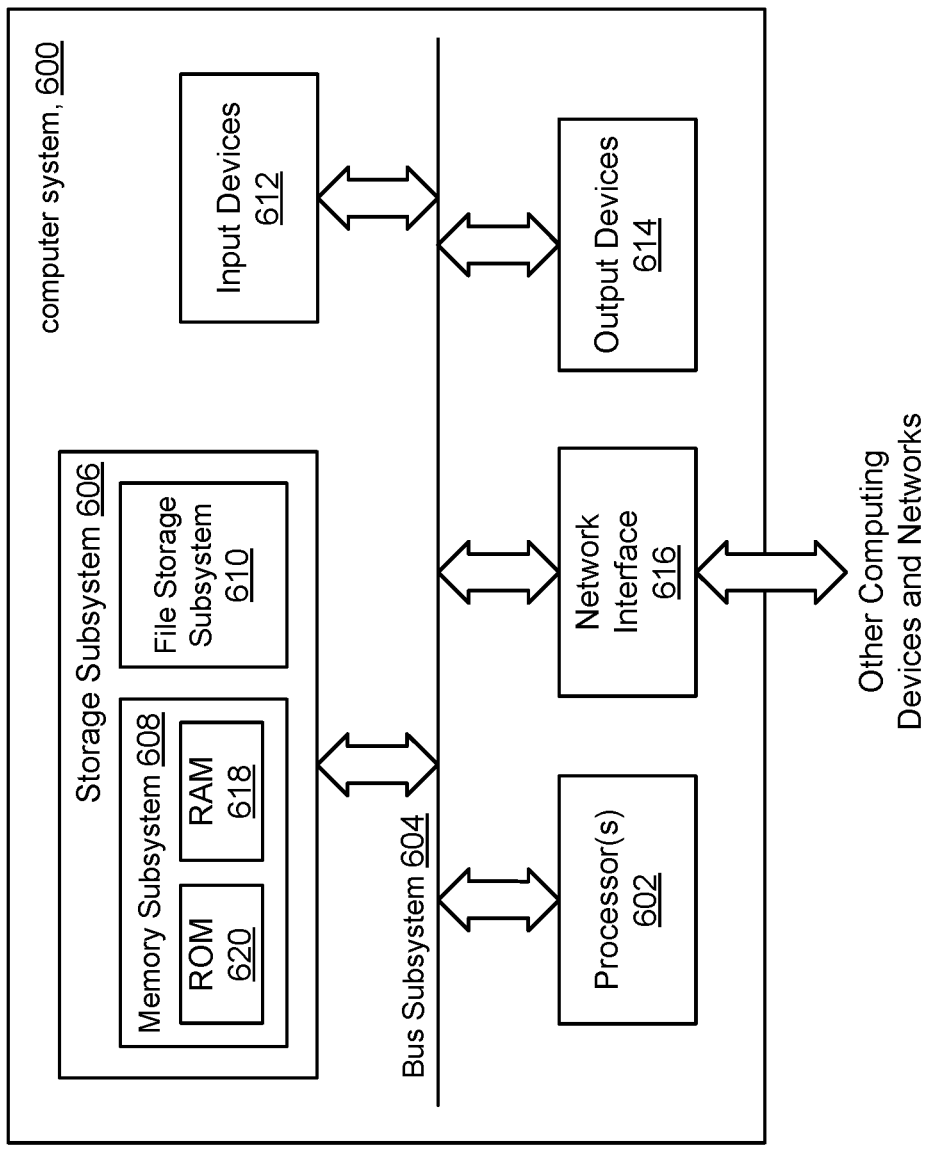
FIG. 6 shows an illustrative example of a computer system that can be adapted in accordance with the present disclosure.

FIG. 6 depicts a simplified block diagram of an example computer system 600 according to certain embodiments. Computer system 600 can be used to implement boundary clocks (e.g., devices 104, FIG. 1) described in the present disclosure. As shown in FIG. 6, computer system 600 includes one or more processors 602 that communicate with a number of peripheral devices via bus subsystem 604. These peripheral devices include storage subsystem 606 (comprising memory subsystem 608 and file storage subsystem 610), user interface input devices 612, user interface output devices 614, and network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple busses.

Network interface subsystem 616 can serve as an interface for communicating data between computer system 600 and other computer systems or networks. Embodiments of network interface subsystem 616 can include, e.g., an Ethernet card, a Wi-Fi and/or cellular adapter, a modem (telephone, satellite, cable, ISDN, etc.), digital subscriber line (DSL) units, and/or the like.

User interface input devices 612 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 600.

User interface output devices 614 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 600.

Memory subsystem 606 includes memory subsystem 608 and file/disk storage subsystem 610 represent non-transitory computer-readable storage media that can store program code and/or data, which when executed by processor 602, can cause processor 602 to perform operations in accordance with embodiments of the present disclosure.

Memory subsystem 608 includes a number of memories including main random access memory (RAM) 618 for storage of instructions and data during program execution and read-only memory (ROM) 620 in which fixed instructions are stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than system 600 are possible.

Examples

The discussion will now turn to various examples to illustrate aspects of the present disclosure discussed in the processing shown in FIG. 4.

Figure 7:
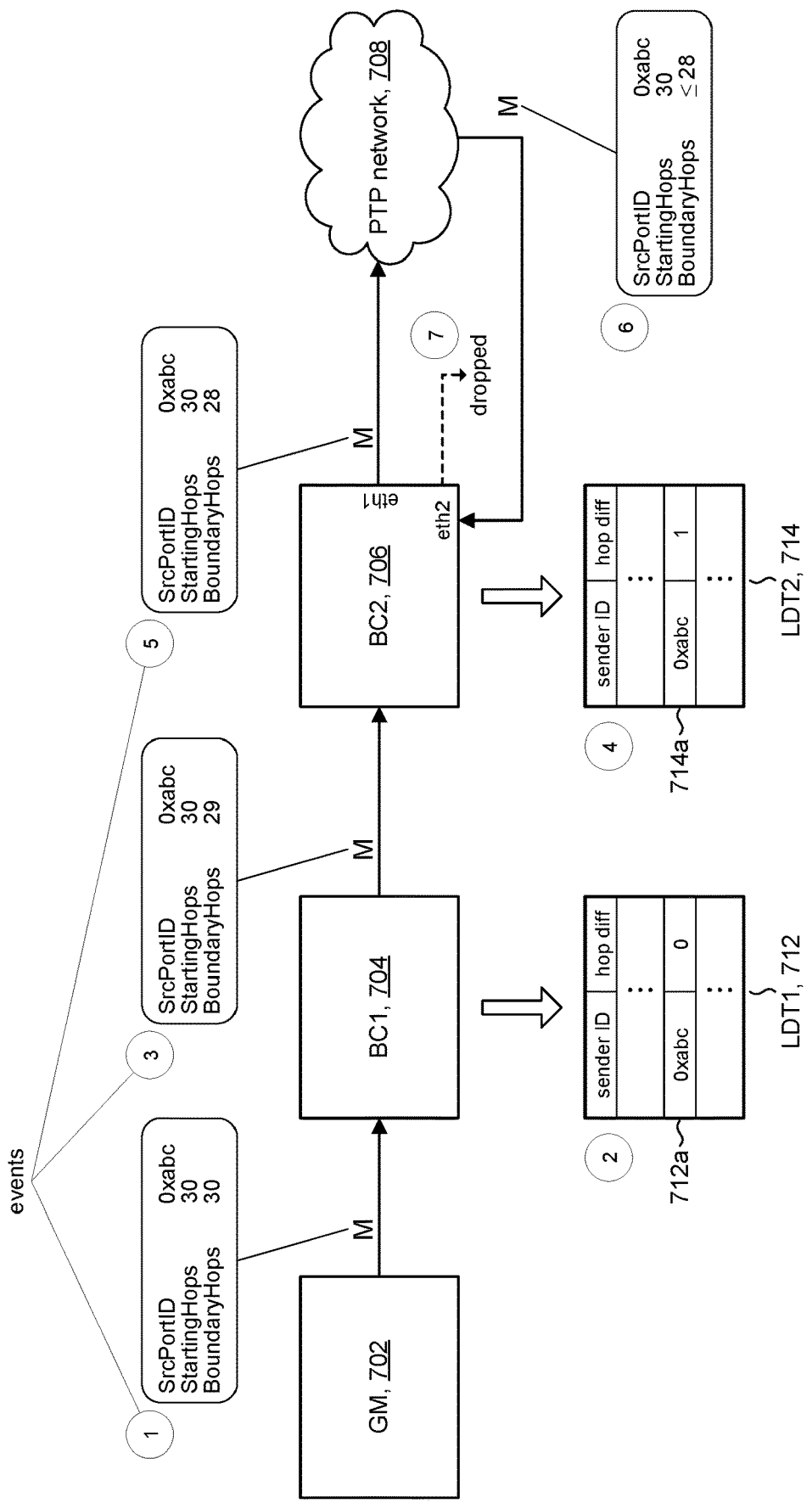
FIG. 7 shows an example of message forwarding in a first configuration in accordance with the present disclosure.

FIG. 7 is a simplified example illustrating the use of loop detection tables, in accordance with some aspects of the present disclosure, to detect management message loops. The example shows a network of clocks that includes a grandmaster clock 702 (GM) and two boundary clocks 704 (BC1), 706 (BC2). The PTP network 708 represents the rest of the network of clocks. A message M is sent from the GM that is successively transmitted to BC1, BC2, and then into the PTP network. The figure depicts the PTP network having some configuration failure that results in the message M looping back to from the PTP network to BC2 and then being dropped by BC2. Event times 1-7 illustrate the sequence of events that leads to BC2 dropping message M.

Time 1 At time 1, the GM makes an initial transmission of a management message M to BC1. The figure shows information contained in the message; for example, the sender of the message is GM which is identified as 0xabc (sender ID). The sender ID in the received message is preserved when the message is retransmitted from one clock to the next, thus preserving the identity of the original sender of the management message, in this case GM 702. The starting hops value is set to 30, although any suitable value can be used; this value remains constant during retransmissions. The boundary hops value is initially set to 30 and is decremented with each retransmission.

Time 2 BC1 maintains a loop detection table 712 (LDT1), and for discussion purposes suppose there is no entry in LDT1 that identifies GM as the sender. Accordingly, at time 2, when BC1 receives message M, BC1 can create/add an entry 712a for the received message and store 0xabc in the sender ID field of entry 712a to identify GM as the sender of the message. BC1 can compute the difference between the starting hops value and the boundary hops value, i.e., 30−30=0, and store that value in the hop diff field of the created entry 712a (reference operation 406 in FIG. 4).

Time 3 At time 3, BC1 can retransmit message M to BC2 (reference operations 406, 414 in FIG. 4). Retransmitting message M includes decrementing the boundary hops value by one. FIG. 7 shows the boundary hops value in the retransmitted message at time 3 is now 29.

Time 4 BC2, likewise, maintains its own loop detection table 714 (LDT2), and likewise we will suppose for discussion purposes there is no entry in LDT2 that identifies GM as the sender. Accordingly, at time 4, when BC2 receives message M, BC2 can create/add an entry 714a for the received message and store 0xabc in the sender ID field of entry 714a to identify GM as the original sender of the message. BC2 can compute the difference between the starting hops value and the boundary hops value, i.e., 30−29=1, and store that value in the hop diff field of the created entry 714a.

Time 5 At time 5, BC1 can retransmit message M to one or more downstream clocks (not shown) in the PTP network. Retransmitting message M includes decrementing the boundary hops value by one. FIG. 7 shows the boundary hops value in the retransmitted message at time 5 is now 28.

Time 6 At time 6, the presumed configuration failure in the PTP network loops message M back to BC2. The message will contain a boundary hops value that is less than (or equal) to 28. The boundary hops value can remain at 28 if the message M was looped back to BC2 by a transparent clock or by a device that was not PTP-enabled. The boundary hops value will be less than 28 if message M was retransmitted by one or more boundary clocks before being looped back to BC2.

Time 7 At time 7, BC2 will determine that an entry 714a in loop detection table LDT2 already exists for the original sender of the received message at time 6, namely 0xabc. BC2 will compute the hop difference in the received message (reference operation 408 in FIG. 4) and come up with a difference that is greater than or equal to 2. Since the hop difference (which is ≥2) in the message is not less than the difference in entry 714a (which is 1), the message is dropped and not forwarded (reference operation 412); the looped back message is stopped as soon as it detected.

Although not shown in FIG. 7, if the GM sends a new management message, it can be seen that the loop detection table entries 712a, 714a in respective loop detection tables LDT1, LDT2 will allow the newly sent message to be forwarded. In BC1, for example, the hop difference in the new message will be '0' which equals the hop difference value in loop detection table entry 712a in BC1, and per operation 408 in FIG. 4, BC1 will allow the message to be forwarded. Likewise, in BC2, the hop difference in the new message will be '1' which equals the hop difference value in loop detection table entry 714a in BC2, and per operation 408 in FIG. 4, BC2 will allow the message to be forwarded.

Figure 8:
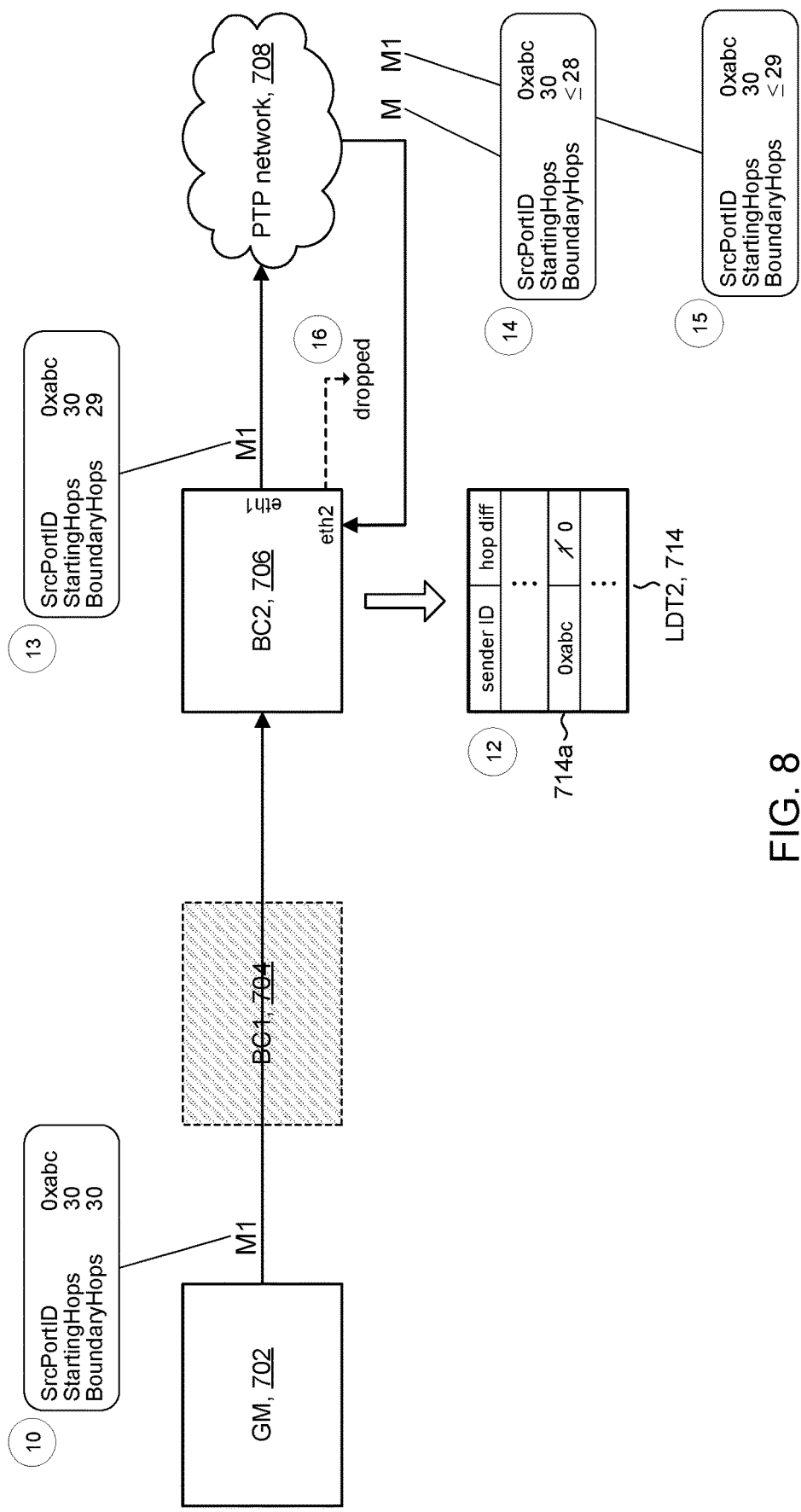
FIG. 8 shows an example of message forwarding in a second configuration in accordance with the present disclosure.

FIG. 8 illustrates a scenario that continues from FIG. 7, but at a time subsequent to the GM sending the initial management message M. Suppose as shown in FIG. 8, that BC1 becomes a transparent clock or otherwise goes down. At time 10, GM sends another management message M1. At time 12, BC2 receives message M1, and sees that its loop detection table LDT2 contains an entry 714a for GM. Recall from time 4 in FIG. 7 the hop difference in entry 714a was '1'. At time 12 in FIG. 8, the hop difference computed by BC2 for message M1 is '0', which is less than '1'. Accordingly, per operation 410 in FIG. 4, BC2 can reset the hop difference in entry 714a to the newly computed value of '0'. FIG. 8 shows that when either or both messages M and M1 loop back to BC2 (at times 15, 16), they will be dropped at time 17 because the hop differences in message M (≥2) and in message M2 (≥1) are both greater than the hop difference in the loop table entry 714a.

Figure 9:
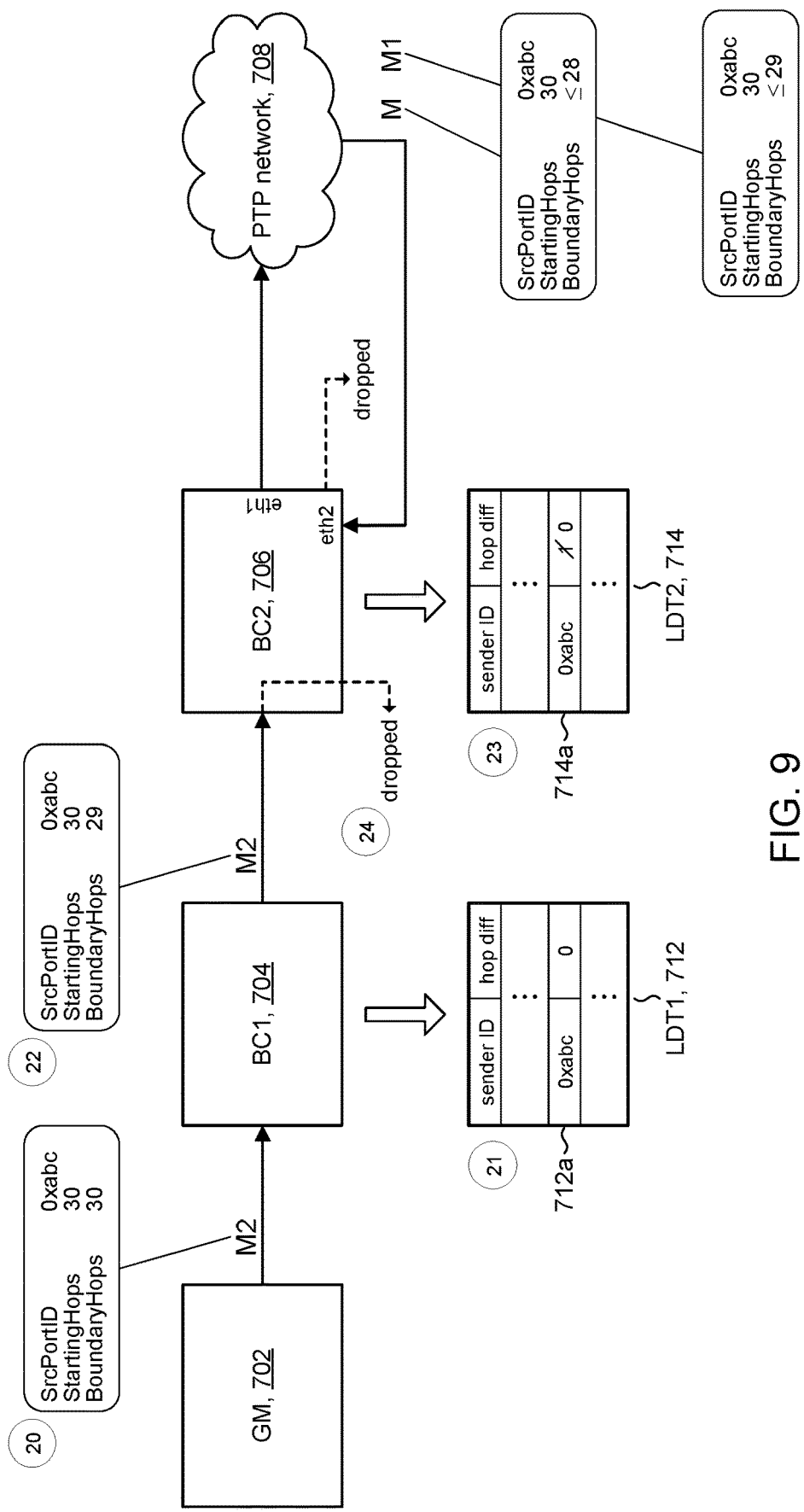
FIG. 9 shows an example of message forwarding in a third configuration in accordance with the present disclosure.

FIG. 9 illustrates a scenario that continues from FIG. 8, but at a time subsequent to the GM sending message M1. Suppose as shown in FIG. 9, that BC1 comes back online. At time 20, GM sends another management message M2. At time 21, BC1 will create an entry 712a in its loop detection table LDT1 based on received message M2. BC1 will retransmit message M2 at time 22 to BC2. When BC2 receives message M2, it sees that its loop detection table LDT2 contains an entry 714a for GM. Recall from FIG. 8, the hop difference in entry 714a was reset to '0'. The hop difference computed by BC2 at time 23, for message M2 is '1, which is greater than '0'. Accordingly, per operation 412 in FIG. 4, BC2 will drop message M2 even though it is not a looped message. Earlier messages, such as M and M1, that loop back to BC2 from the PTP network will also be dropped by operation of entry 714a in LDT2, as well as any additional new messages from the GM. Eventually, however, BC2 will no longer receive messages M and M1 from the PTP network, and the aging process will eventually age out loop detection table entry 714a in LDT2 and any new messages from the GM will be allowed to go forward.

Hop Difference

It is noted that the hop difference for a management message computed in the foregoing embodiments can be viewed as the number of hops the message had taken since the message was originally sent. Referring to FIG. 7, for example, at time 2 the hop difference stored in the entry 712a in BC1 has a value of zero. Since the message originated from the GM 702, the message can be viewed as having taken zero hops before reaching BC1. Likewise, at time 4, the hop difference stored in the entry 714a in BC3 has a value of one, which can be viewed as the number of hops the message had taken (i.e., one hop via BC1) by the time it reached BC2.

Accordingly, in some embodiments, the hop difference can refer to the number of hops that a received message had taken since the message was originally sent by the time it reached a clock, where the original sending of the message does not count as a hop. In some embodiments, the operations described in connection with FIG. 4 can be explained in terms of "hops taken" instead of "hop difference."

Further Examples

In accordance with some embodiments, a method can include receiving a message comprising a sender identifier (ID), a starting hop value, and a remaining hop value. The received message can be forwarded when the sender ID in the received message and the sender ID in a previously received message identify the same sender and a difference computed from the starting hop value and the remaining hop value in the received message is less than or equal to a difference computed from the starting hop value and the remaining hop value in the previously received message. The received message can be dropped when the sender ID in the received message and the sender ID in the previously received message identify the same sender and the difference between the starting hop value and the remaining hop value in the received message is greater than the difference between the starting hop value and the remaining hop value in the previously received message.

In some embodiments, the method can further include forwarding the received message when the sender of the received message has not sent any previously received message.

In some embodiments, the method further includes using a data table of senders of previously received messages to determine whether to forward or drop the received message, the data table comprising sender IDs in previously received messages and differences computed from starting hop values and the remaining hop values in the previously received messages. The method can further include creating an entry in the data table when the sender ID in the received message does not occur in the data table and storing the sender ID in the received message and the difference between the starting hop value and the remaining hop value in the received message in the created entry. The method can further include deleting a given entry from the data table when an age of the given entry exceeds a predetermined age.

In some embodiments, forwarding the received message can include decrementing the remaining hop value in the received message.

In some embodiments, the received message can be a management message in accordance with Precision Time Protocol.

In accordance with some embodiments, an apparatus can include one or more computer processors and a computer-readable storage medium comprising instructions for controlling the one or more computer processors to receive a message comprising a sender identifier (ID) and hop information indicative of a number of hops taken by the received message; forward the received message when the sender ID in the received message and the sender ID in a previously received message identify the same sender and the number of hops taken by the received message is less than or equal to a number of hops taken by the previously received message; and drop the received message when the sender ID in the received message and the sender ID in a previously received message identify the same sender and the number of hops taken by the received message is greater than the number of hops taken by the previously received message.

In some embodiments, the received message can further comprise a starting hop value and the remaining hop value, wherein the number of hops taken by the received message is a difference between the starting hop value and the remaining hop value in the received message, wherein the number of hops taken by the previous message is a difference between a starting hop value and a remaining hop value in the previous message.

In some embodiments, the computer-readable storage medium can further comprise instructions for controlling the one or more computer processors to forward the received message when the sender of the received message has not sent any previously received message.

In some embodiments, the computer-readable storage medium can further comprise instructions for controlling the one or more computer processors to use a data table of senders of previously received messages to determine whether to forward or drop the received message, the data table comprising sender IDs in previously received messages and information indicative of how many hops the previously received messages had taken. In some embodiments, the computer-readable storage medium can further comprise instructions for controlling the one or more computer processors to create an entry in the data table when the sender ID in the received message does is not found in the data table and storing the sender ID in the received message and the difference between the starting hop value and the remaining hop value in the received message in the created entry. In some embodiments, the computer-readable storage medium can further comprise instructions for controlling the one or more computer processors to delete a given entry from the data table when an age of the given entry exceeds a predetermined age.

In some embodiments, forwarding the received message can include decrementing the remaining hop value in the received message.

In accordance with some embodiments, an apparatus can include one or more computer processors and a computer-readable storage medium comprising instructions for controlling the one or more computer processors to receive a message comprising information that identifies a sender of the received message; forward the received message to a downstream apparatus when the received message is not a previously received message sent by the sender that has looped back to the apparatus; and drop the received message when the received message is a previously received message sent by the sender that has looped back to the apparatus.

In some embodiments, the received message can further comprise a starting hop value and a remaining hop value, wherein the previously received message is deemed not to have looped back to the apparatus when a difference computed from the starting hop value and the remaining hop value in the received message is less than or equal to a difference computed from the starting hop value and the remaining hop value in the previously sent message.

In some embodiments, wherein the received message can further comprise a starting hop value and a remaining hop value, wherein the previously received message is deemed to have looped back to the apparatus when a difference computed from the starting hop value and the remaining hop value in the received message is greater than a difference computed from the starting hop value and the remaining hop value in the previously sent message.

In some embodiments, the computer-readable storage medium can further comprise instructions for controlling the one or more computer processors to use a data table of senders of previously received messages to determine whether to forward or drop the received message, the data table comprising sender identifiers (IDs) that identify senders of previously received messages and information indicative of how many hops the previously received messages had taken. In some embodiments, the computer-readable storage medium can further comprise instructions for controlling the one or more computer processors to create an entry in the data table when a sender ID in the received message is not found in the data table and storing the sender ID in the received message and the difference between the starting hop value and the remaining hop value in the received message in the created entry. In some embodiments, the computer-readable storage medium can further comprise instructions for controlling the one or more computer processors to delete a given entry from the data table when an age of the given entry exceeds a predetermined age.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
   receiving a message comprising a sender identifier (ID), a starting hop value, and a remaining hop value;
   forwarding the received message when the sender ID in the received message and the sender ID in a previously received message identify the same sender and a difference computed from the starting hop value and the remaining hop value in the received message is less than or equal to a difference computed from the starting hop value and the remaining hop value in the previously received message; and
   dropping the received message when the sender ID in the received message and the sender ID in the previously received message identify the same sender and the difference between the starting hop value and the remaining hop value in the received message is greater than the difference between the starting hop value and the remaining hop value in the previously received message.

2. The method of claim 1, further comprising forwarding the received message when the sender of the received message has not sent any previously received message.

3. The method of claim 1, further comprising using a data table of senders of previously received messages to determine whether to forward or drop the received message, the data table comprising sender IDs in previously received messages and differences computed from starting hop values and the remaining hop values in the previously received messages.

4. The method of claim 3, further creating an entry in the data table when the sender ID in the received message does not occur in the data table and storing the sender ID in the received message and the difference between the starting hop value and the remaining hop value in the received message in the created entry.

5. The method of claim 3, further comprising deleting a given entry from the data table when an age of the given entry exceeds a predetermined age.

6. The method of claim 1, wherein forwarding the received message includes decrementing the remaining hop value in the received message.

7. The method of claim 1, wherein the received message is a management message in accordance with Precision Time Protocol.

8. An apparatus comprising:
   one or more computer processors; and
   a computer-readable storage medium comprising instructions for controlling the one or more computer processors to:
   receive a message comprising a sender identifier (ID) and hop information indicative of a number of hops taken by the received message;
   forward the received message when the sender ID in the received message and the sender ID in a previously received message identify the same sender and the number of hops taken by the received message is less than or equal to a number of hops taken by the previously received message; and
   drop the received message when the sender ID in the received message and the sender ID in a previously received message identify the same sender and the number of hops taken by the received message is greater than the number of hops taken by the previously received message.

9. The apparatus of claim 8, wherein the received message further comprises a starting hop value and the remaining hop value, wherein the number of hops taken by the received message is a difference between the starting hop value and the remaining hop value in the received message, wherein the number of hops taken by the previous message is a difference between a starting hop value and a remaining hop value in the previous message.

10. The apparatus of claim 8, wherein the computer-readable storage medium further comprises instructions for controlling the one or more computer processors to forward the received message when the sender of the received message has not sent any previously received message.

11. The apparatus of claim 8, wherein the computer-readable storage medium further comprises instructions for controlling the one or more computer processors to use a data table of senders of previously received messages to determine whether to forward or drop the received message, the data table comprising sender IDs in previously received messages and information indicative of how many hops the previously received messages had taken.

12. The apparatus of claim 11, wherein the computer-readable storage medium further comprises instructions for controlling the one or more computer processors to create an entry in the data table when the sender ID in the received message does is not found in the data table and storing the sender ID in the received message and the difference between the starting hop value and the remaining hop value in the received message in the created entry.

13. The apparatus of claim 11, wherein the computer-readable storage medium further comprises instructions for controlling the one or more computer processors to delete a given entry from the data table when an age of the given entry exceeds a predetermined age.

14. The apparatus of claim 8, wherein forwarding the received message includes decrementing the remaining hop value in the received message.

15. An apparatus comprising:
   one or more computer processors; and
   a computer-readable storage medium comprising instructions for controlling the one or more computer processors to:
   receive a message comprising information that identifies a sender of the received message;
   forward the received message to a downstream apparatus when the received message is not a previously received message sent by the sender that has looped back to the apparatus; and
   drop the received message when the received message is a previously received message sent by the sender that has looped back to the apparatus.

16. The apparatus of claim 15, wherein the received message further comprises a starting hop value and a remaining hop value, wherein the previously received message is deemed not to have looped back to the apparatus when a difference computed from the starting hop value and the remaining hop value in the received message is less than or equal to a difference computed from the starting hop value and the remaining hop value in the previously sent message.

17. The apparatus of claim 15, wherein the received message further comprises a starting hop value and a remaining hop value, wherein the previously received message is deemed to have looped back to the apparatus when a difference computed from the starting hop value and the remaining hop value in the received message is greater than a difference computed from the starting hop value and the remaining hop value in the previously sent message.

18. The apparatus of claim 15, wherein the computer-readable storage medium further comprises instructions for controlling the one or more computer processors to use a data table of senders of previously received messages to determine whether to forward or drop the received message, the data table comprising sender identifiers (IDs) that identify senders of previously received messages and information indicative of how many hops the previously received messages had taken.

19. The apparatus of claim 18, wherein the computer-readable storage medium further comprises instructions for controlling the one or more computer processors to create an entry in the data table when a sender ID in the received message is not found in the data table and storing the sender ID in the received message and the difference between the starting hop value and the remaining hop value in the received message in the created entry.

20. The apparatus of claim 18, wherein the computer-readable storage medium further comprises instructions for controlling the one or more computer processors to delete a given entry from the data table when an age of the given entry exceeds a predetermined age.

* * * * *